(12) United States Patent
Grubb et al.

(10) Patent No.: US 6,282,002 B1
(45) Date of Patent: Aug. 28, 2001

(54) OPTICAL SIGNAL VARYING DEVICES

(75) Inventors: Stephen G. Grubb; Raymond Zanoni, both of Columbia; Thomas D. Stephens, Ellicott City, all of MD (US)

(73) Assignee: Corvis Corporation, Columbia, MD (US)

( * ) Notice: Subject to any disclaimer, the term of this patent is extended or adjusted under 35 U.S.C. 154(b) by 0 days.

(21) Appl. No.: 09/544,487

(22) Filed: Apr. 7, 2000

Related U.S. Application Data (62) Division of application No. 09/119,556, filed on Jul. 21, 1998, now Pat. No. 6,115,174.

(51) Int. Cl.$^7$ .................................................... H04J 14/02
(52) U.S. Cl. ............................................. 359/160; 359/134
(58) Field of Search .................................... 359/134, 160, 359/173, 334, 337, 341

(56) References Cited

U.S. PATENT DOCUMENTS

| 4,315,666 | 2/1982 | Hicks, Jr. ........................... 350/96.15 |
| 4,342,499 | 8/1982 | Hicks, Jr. ........................... 350/96.15 |
| 4,401,364 | 8/1983 | Mochizuki ........................ 350/96.16 |
| 4,616,898 | 10/1986 | Hicks, Jr. ........................... 350/96.15 |

(List continued on next page.)

FOREIGN PATENT DOCUMENTS

| 0 734 105 A2 | 9/1996 | (EP) . |
| 07202306 | 8/1995 | (JP) . |
| WO 98/42088 | 9/1998 | (WO) . |

OTHER PUBLICATIONS

Aide K., et al., Long–Span Repeaterless IM/DD Optical Transmission Experiment over 300 KM using Optical Amplifiers, ICC '91, vol. 3, pp. 1228–1232, 1991, Published: New York, NY USA.

Takano, K., et al., An Optical Pre–Amplifier With Automatic Gain Control Function, Proceedings of the 1995 IEICE General Conference, Mar. 27–30, 1995, Fukuoka, Fukuoka Institute of Technology b–1067, p. 513.

Wen, Senfar, et al., IEEE Photonics Technology Letters, Feb. 1992, vol. 4, No. 2, New York, US, pp. 189–192, IEEE Log No.: 9105789.

Stentz, A., et al., OSA Trends in Optics and Photonics, vol. 5 Optical Amplifiers and Their Applications. From the Topical Meeting, pp. 350–368, Published: Washington, DC, USA, 1996.

(List continued on next page.)

*Primary Examiner*—Leslie Pascal
*Assistant Examiner*—Dalzid Singh (57) ABSTRACT

Optical systems of the present invention include a plurality of optical processing nodes in optical communication via at least one signal varying device. The signal varying devices includes an optical fiber suitable for facilitating Raman scattering/gain in a signal wavelength range and a pump energy source for providing pump energy in a plurality of pump wavelengths. The pump source provides sufficient pump energy in each pump wavelength to stimulate Raman scattering/gain in the optical fiber within the signal wavelength range. The pump wavelengths are selected such that the combined Raman gain resulting from the pump energy supplied by each pump wavelength produces a desired signal variation profile in the signal wavelength range. In addition, the pump energy supplied by at least one of the pump wavelengths can be varied to produce a controlled signal intensity variation profile over the signal wavelength range in the optical fiber.

26 Claims, 7 Drawing Sheets

U.S. PATENT DOCUMENTS

| | | | |
|---|---|---|---|
| 4,699,452 | 10/1987 | Mollenauer et al. | 350/96.15 |
| 4,728,170 | 3/1988 | Robertson | 350/96.15 |
| 4,881,790 | 11/1989 | Mollenauer | 350/96.16 |
| 5,039,199 | 8/1991 | Mollenauer et al. | 359/334 |
| 5,083,874 | 1/1992 | Aida et al. | 385/24 |
| 5,095,519 | 3/1992 | Dorsey | 385/140 |
| 5,191,628 | 3/1993 | Byron . | |
| 5,228,105 | 7/1993 | Glista . | |
| 5,406,411 | 4/1995 | Button et al. | 359/341 |
| 5,541,766 | 7/1996 | Mizrahi et al. | 359/337 |
| 5,557,442 | 9/1996 | Huber | 359/179 |
| 5,633,974 | 5/1997 | Chia | 385/140 |
| 5,636,301 | 6/1997 | O'Sullivan et al. | 385/24 |
| 5,651,085 | 7/1997 | Chia | 385/140 |
| 5,694,512 | 12/1997 | Gonthier et al. | 385/140 |
| 5,696,615 | 12/1997 | Alexander | 359/134 |
| 5,883,736 | 3/1999 | Oshima et al. | 359/341 |
| 5,920,423 | * 7/1999 | Grubb et al. | 359/341 |
| 5,963,361 | 10/1999 | Taylor et al. | 359/337 |
| 5,999,548 | 12/1999 | Mori et al. | 372/22 |
| 6,031,646 | * 2/2000 | Sniadower | 359/160 |
| 6,055,092 | * 4/2000 | Sugaya et al. | 359/337 |
| 6,057,959 | * 5/2000 | Taylor et al. | 359/341 |
| 6,081,366 | * 6/2000 | Kidorf et al. | 359/341 |
| 6,122,298 | * 9/2000 | Kerfoot, III et al. | 372/6 |

OTHER PUBLICATIONS

Park, S.Y., et al., Feasibility Demonstration of 10 Gbit/s Channel WDM Network Using Dynamic Gain–Controlled EDFAs, Electronics Letters, 5th Mar. 1998, vol. 34, No. 5., Online No. 19980346.

Dung, J.C., et al., Gain Flattening of Erbium Doped Fibre Amplifier Using Fibre Bragg Gratings, Electronics Letters, 19th Mar. 1998, vol. 34, No. 6., Online No. 19980446.

Masuda, H., et al., Ultra–Wideband Optical Amplification with a 3–dB Bandwidth of 67 nm Using a Partially Gain Flattened Erbium–Doped Fiber Amplifier and Raman Amplification, Optical Amplifiers and their Application, Aug. 3–5, 1994, 1997 OSA Technical Digest Series, V20, pp. MC3–1–4/40–3.

Sugaya, Y., et al., Novel Configuration for Low–Noise and Wide–Dynamic–Range Er–Doped Fiber Amplifiers for WDM Systems, Optical Amplifiers and their Application, Jun. 15–17, 1995, 1995 OSA Technical Digest Series, V18, pp. FC3–1–4/158–161.

Jacobovitz–Veselka, G.R., et al., Single–Stage Booster Amplifier With Two 980 nm Pumps Stabilized by Fiber Gratings, Optical Amplifiers and their Application, Jun. 15–17, 1995, 1995 OSA Technical Digest Series, V18, pp. FC4–1–4/162–165.

Hansen, P.B., et al., Loss Compensation in Dispersion Compensating Fiber Modules by Raman Amplification, OFC'98 Technical Digest pp. 20–21.

Rottwitt, K., et al., Detailed Analysis of Raman Amplifiers for Long–Haul Transmission, OFC'98 Technical Digest pp. 30–31.

Chernikov, S.V., et al., 10 Gbit/s Error–Free Transmission of 2–ps Pulses Over a 45–km Span Using Distributed Raman Amplification at 1300 nm, OFC'98 Technical Digest p. 31.

Kawai, S., et al., Ultrawide 75 nm 3–dB Gain–Band Optical Amplifier Utilizing Erbium–Doped Fluoride Fiber and Raman Fiber, OFC'98 Technical Digest pp. 32–33.

Dianov, E.M., et al., Highly Efficient 1.3 $\mu$m Raman Amplifier, OFC'98 Technical Digest pp. 33–34.

Rottwitt, K., et al., A 92 nm Bandwidth Raman Amplifier, OFC'98, Post–Deadline Paper PD6–1–4.

Srivastava, A. K., et al., 1 Tb/s Transmission of 100 WDM 10 Gb/s Channels Over 400 km of TrueWave Fiber, OFC'98, Post–Deadline Paper PD10–1–4.

Masuda, H. et al., Ultra–Wideband Hybrid Amplifier Comprising Distributed Raman Amplifier and Erbium–Doped Fiber Amplifier, Electronics Letters, 25th Jun. 1998, vol. 34, No. 13, Online No. 19980935.

Zou et al., Compensation of Raman Scattering and EDFA's Nonuniform Gain in Ultra–Long–Distance WDM Links, IEEE Photonics Technology Letters, vol. 8, No. 1, Jan. 1996, pp. 139–141.

Grubb, S. G., Raman Amplifiers for Broadband Communications, OFC '98, OSA Technical Digest Series vol. 2, 1998, abstract.

* cited by examiner

OPTICAL SIGNAL VARYING DEVICES

This application is a divisional application of U.S. patent application Ser. No. 09/119,556 filed Jul. 21, 1998, now U.S. Pat. No. 6,115,174, which is incorporated herein by reference.

BACKGROUND OF THE INVENTION

The present invention is directed generally to optical signal varying devices that provide for controllably varying optical signal characteristics. More particularly, the invention relates to optical amplifiers and attenuators that have controllable gain, loss and transparent intensity profiles for use in optical communication systems.

The continued development of digital technology has provided electronic access to vast amounts of information. The increased access to information has fueled an increasing desire to quickly obtain and process the information. This desire has, in turn, driven demand for faster and higher capacity electronic information processing equipment (computers) and transmission networks and systems'linking the processing equipment (telephone lines, cable television (CATV) systems, local, wide and metropolitan area networks (LAN, WAN, and MAN)).

In response to this demand, telecommunications companies have turned to optical communication systems to provide substantially larger information bandwidth transmission capacities than traditional electrical communication systems. Early optical transmission systems, known as space division multiplex (SDM) systems, transmitted one information signal using a single wavelength in a waveguide, i.e. fiber optic strand. Time division multiplexing (TDM) multiple information signals onto a single wavelength in a known sequence that can be separated upon receipt has further increased the transmission capacity of optical systems.

The continued growth in traditional communications systems and the emergence of the Internet as a means for accessing data has further accelerated the demand for higher capacity communications networks. Telecommunications companies have looked to wavelength division multiplexing (WDM) to further increase the capacity of their existing systems. In WDM transmission systems, pluralities of distinct TDM or SDM information signals are carried using electromagnetic waves having different wavelengths. The pluralities of information carrying wavelengths are combined into a multiple wavelength signal, which is transmitted in a single waveguide. In this manner, WDM systems can increase the transmission capacity of existing SDM/TDM systems by a factor equal to the number of wavelengths used in the WDM system.

Optical WDM systems were not initially deployed, in part, because high cost electrical signal regeneration/amplification equipment was required for each optical wavelength throughout the system. However, the development of the erbium doped fiber optical amplifier (EDFA) eliminated the need for electrical signal regeneration/amplification equipment and the associated costs in many systems, thereby making WDM a cost effective means to increase network capacity.

Erbium doped fiber amplifiers ("EDFAs") can theoretically be used to amplify signals in an amplification wavelength range spanning from approximately 1500 nm and 1600 nm. However, EDFAs do not equally amplify each optical signal wavelength within the range. The differences in amplification can result in attenuation of some signals and/or signal loss or distortion because of highly amplified noise. Thus, the performance of EDFAs in a transmission system varies depending upon the number of wavelengths and the wavelengths used in the system.

Judicious selection of the wavelengths and amplifier powers used in a system can minimize EDFA variations (gain non-uniformities). For example, many WDM systems currently restrict the wavelengths used in the system to between 1540 nm and 1560 nm, a range in which EDFAs comparably amplify optical signals. As might be expected, restricting system designs to only those wavelengths that are comparably amplified by EDFAs severely limits the number of wavelengths and the information transmission capacity of WDM systems.

The number of wavelengths in the system can be increased to some extent, if only a small number of amplifiers are used in the system. The small number of amplifiers allows wavelengths having differing EDFA amplification characteristics to be used, because the cumulative amplifier variations do not swamp out lowly amplified signals.

In addition to the wavelength dependence, EDFA performance is also a function of the amplification power supplied to the EDFA. Thus, EDFAs generally must be operated with a limited power range to minimize amplification variations in the system. The amplifier power limitations, in turn, increase the number of amplifiers in a system by limiting the allowable distance between EDFAs, i.e., the span length.

In discussing the signal intensity variation of EDFAs and other devices, the uniformity of gain or loss profiles over a wavelength range is generally referred to as the flatness of the profile. A perfectly flat profile is a gain, loss, or transparency profile that has a constant value over the wavelength range of interest.

WDM system constraints imposed by EDFA wavelength variations have focused attention on providing EDFA configurations that compensate for the variations and provide more uniform gain for a larger band of wavelengths and over a greater power range. Various EDFA configurations have been proposed to minimize amplifier gain variations. For example, see U.S. Pat. Nos. 5,406,411, 5,541,766, 5,557, 442, 5,636,301, and 5,696,615; Sugaya et al., Optical Amplifiers and Their Applications, Technical Digest OSA 1995 v. 18, pp. 158–161/FC3-1; Jacobovitz-Veselka et al., Optical Amplifiers and Their Applications, Technical Digest OSA 1995 v. 18, pp. 162–165/FC3-1; Park et al., Electronics Letters, Mar. 5, 1998, Vol. 34, No. 5, Online No. 19980346; and, Dung et al., Electronics Letters, Mar. 19, 1998, v. 34, n. 6, Online No. 19980446.

Other amplifier configurations have used EDFAs in combination with a Raman amplifier to statically vary the gain profile of an EDFA. For example, see Masuda et al., OSA 1997, pp. 40-3/MC3-1, Masuda et al., Electronics Letters, v34, n13, Online No. 19980935 (Jun. 25, 1998), and U.S. Pat. No. 5,083,874 issued to Aida et al. It has also been proposed to eliminate EDFAs and use amplifier configurations that employ only Raman amplifiers. However, the all-Raman configurations to date have not greatly improved the amplifiers gain flatness profile and may still require gain equalization to flatten the gain profile as discussed by Rottwitt et al.,"A 92 nm Bandwidth Raman Amplifier", OFC '98, p. 72/CAT-1.

The above referenced gain flattened configurations are generally statically configured to have a wavelength range defined by a 3 dB variation (~ a factor of 2) in the gain profile and having a +1 dB variation between wavelengths. The gain flattened amplifiers provide some improvement over conventional EDFAs in the number of amplifiers, amplifier power ranges, and span lengths before the signal must be regenerated. The gain flattened optical amplifiers nonetheless introduce excess amplifier noise and gain non-uniformities that limit the number of optical amplifiers that can be used in a WDM system prior to signal regeneration.

Gain flattening in optical amplifier configurations is generally performed using filters and/or attenuators to decrease the signal intensity of the wavelengths to a specified value. For example, in many embodiments, the optical signals are amplified to an intensity higher than the amplifier output value and the filters and attenuators are used to flatten the gain profile by decreasing the optical signal intensity. These methods tend to increase the noise in the signal with a corresponding decrease in the output power of the device.

Optical filters and attenuators can be separate optical devices added to the system or all-fiber devices, such as Bragg grating filters and all-fiber attenuators as discussed in U.S. Pat. Nos. 4,728,170, 5,095,519, 5,633,974, 5,651,085, and 5,694,512. The filters and attenuators can be variable or fixed depending upon the configuration. The amplifier, filters, and attenuators are statically configured to flatten the gain profile.

As the demand for transmission capacity continues to increase, there is an increasing need for systems that span longer distances and provide for an increasing number of information carrying wavelengths/channels. Thus far, it has proven difficult to balance the non-linear gain of EDFA configurations with selective wavelength filtering and attenuation to provide gain flattened amplifier configurations that meet this need.

Accordingly, there is a need for optical amplifiers and attenuator particularly, and signal varying devices generally, that provide increased control over the intensity profile of optical signal in the optical systems. The improved signal varying devices will provide for higher capacity, more versatile, longer distance communication systems.

BRIEF SUMMARY OF THE INVENTION

The apparatuses and methods of the present invention address the above difficulties with prior art optical devices and systems. An optical system of the present invention includes a plurality of optical processing nodes in optical communication via at least one signal varying device. The signal varying devices includes an optical fiber suitable for facilitating Raman scattering/gain in a signal wavelength range and a pump energy source for providing pump energy in a plurality of pump wavelengths. The pump source provides sufficient pump energy in each pump wavelength to stimulate Raman scattering/gain in the optical fiber within the signal wavelength range.

The pump wavelengths are selected such that the combined Raman gain resulting from the pump energy supplied by each pump wavelength produces a desired signal variation profile in the signal wavelength range. In addition, the pump energy supplied by at least one of the pump wavelengths can be dynamically varied to produce a controlled signal intensity variation profile over the signal wavelength range in the optical fiber. In an embodiment, four pump wavelengths spaced in 10–30 nm intervals can be used to provide intensity gain and flatness control to over 30 nm to within ±0.2 dB.

Also in an embodiment, erbium doped fiber is used in combination with the signal varying device to provide a multiple stage signal varying device. The erbium doped fiber and the multiple wavelength controlled Raman portion of the signal varying device can be operated in conjunction to impart a desired intensity profile to the optical signal.

The design and length of the optical fiber used in conjunction with the pump source can be tailored to provide flexibility in operation of the system. For example, a concentrated, or lumped, high gain signal varying device can be provided using a small core fiber, such as dispersion compensated fiber. The lumped device further provides for a greater range over which the signal varying device can be used as an attenuator because of its higher loss. In addition, a distributed low gain signal varying device can be provided using a lower attenuation transmission fiber that can provide control over a smaller intensity variation range. The concentrated and distribution Raman signal varying devices can be used alone or in combination to statically or dynamically impart desired signal varying characteristics to the system.

In this manner, the signal intensity over a range of wavelengths can be controlled using the signal varying devices of the present invention. Accordingly, the present invention addresses the aforementioned problems and provides signal varying devices and methods that provide increased control over optical signal characteristics in an optical system. These advantages and others will become apparent from the following detailed description.

BRIEF DESCRIPTION OF THE DRAWINGS

Embodiments of the present invention will now be described, by way of example only, with reference to the accompanying Figures wherein like members bear like reference numerals and wherein.

DETAILED DESCRIPTION OF THE INVENTION

The optical systems 10 of the present invention will be described generally with reference to the drawings for the purpose of illustrating present embodiments only and not for purposes of limiting the same.

Figure 1:
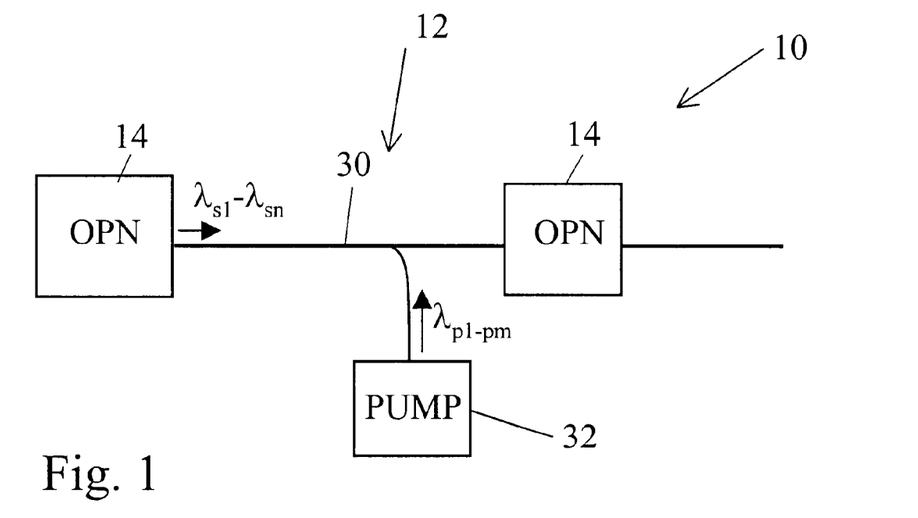
FIGS. 1–2 shows optical communication systems of the present invention.
Figure 2:
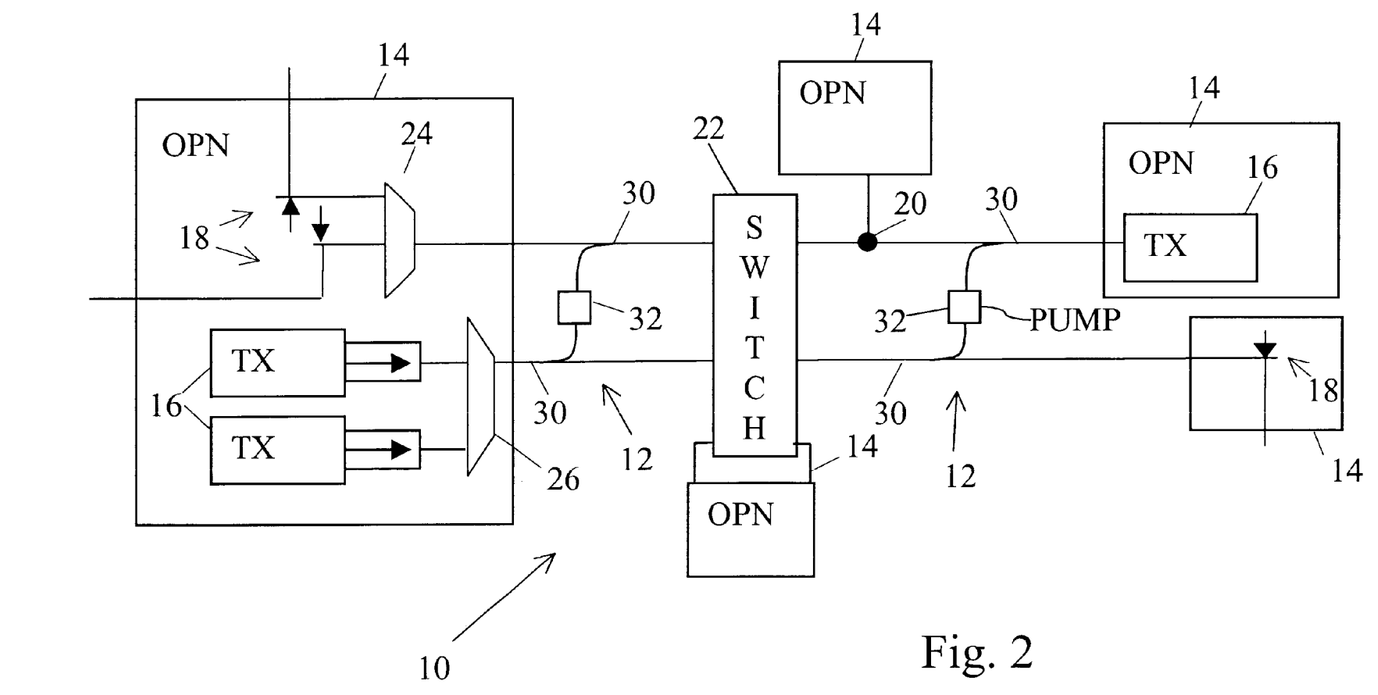

FIG. 1 shows an optical system 10 in which a signal varying device 12 is optically connected between two optical processing nodes 14. As shown in FIG. 2, the optical processing nodes 14 generally include at least one transmitter 16 for transmitting optical signals in at least one information carrying wavelength to at least one optical signal receiver 18 located in another processing node 14.

As is known in the art, the transmitter 16 can include one or more modulated light sources or emitters, such as lasers, incoherent sources, or other sources. Likewise, the receiver 18 can employ direct or indirect, e.g. coherent, detection equipment, such as photodiodes and wavelength selective devices as are known in the art, corresponding to the number of wavelengths to be received. The optical processing nodes 14 may further include add and/or drop ports 20, switches 22, signal splitters 24 and combiners 26, or other signal processing devices as are further known in the art.

As shown in FIGS. 1 and 2, the signal varying device 12 includes optical fiber 30 in optical communication with the processing nodes 14 and a pump energy source 32. The optical fiber 30 is selected to facilitate Raman scattering/gain over a range of transmission wavelengths that include optical signal wavelengths $\lambda_{s1}-\lambda_{sn}$, when the fiber 30 is stimulated using pump energy provided in a pump wavelength range. With proper pump wavelength selection, it is expected that Raman gain can be provided across the optical fiber transparent transmission wavelength range, which currently ranges from approximately 1240 to 1650 nm for silica based fiber. For example, in the transmission signal wavelength range of 1520 nm to 1620 nm, the corresponding pump wavelength,range is approximately 1420 nm to 1510 nm. Likewise, in the transmission signal wavelength range of 1250 nm to 1350 nm, the corresponding pump wavelength range is 1120 nm to 1240 nm. It is also expected that changes in the optical fiber transmission wavelength range can be accommodated by the present invention by proper selection of pump wavelengths.

The pump energy source 32 provides pump energy to the fiber 30 in a plurality of pump wavelengths, $\lambda_{p1}-\lambda_{pm}$, within the pump wavelength range. The pump energy can be supplied to the fiber 30 counter-directionally and/or codirectionally with the optical signals $\lambda_{s1}-\lambda_{sn}$ being transmitted in the system 10. In addition, the pump source 32 can supply the pump energy at one or more points along the fiber 30. In at least one embodiment, the pump energy is supplied from one point on the fiber 30 and counter-directionally to the optical signal. This configuration tends to lessen pump and signal-pump separation complexity and interference between the pump energy and the optical signal.

The optical fiber 30 used in the signal varying device 12 can be the same as the transmission fiber in the system 10 or another type of optical fiber having properties that differ from the transmission fiber in the system 10. The length and type of fiber deployed in the system 10 can be tailored to provide flexibility in the operation of the system.

For example, the extent of Raman scattering in the fiber is partly dependent upon the size of the optical fiber core. In addition, the loss in the fiber increases as the size of the core decreases. Thus, a concentrated, or lumped, high gain/loss signal varying device can be provided using a small core fiber.

In at least one embodiment, a small core dispersion compensated fiber ("DCF"), such as is manufactured by Lucent Technologies, is used to produce a concentrated signal varying device 12. The DCF concentrated device 12 provides for a greater range over which the signal varying device can be used as an attenuator, an amplifier, or a transparent link, because of the high attenuation/high gain properties of the DCF. Conversely, a distributed low gain signal varying device 12 can be provided using a lower attenuation transmission fiber that provides for intensity control over a smaller intensity variation (gain/loss) range.

The pump source 32 can be any source of pump energy that is sufficient to induce Raman gain in the transmission wavelength range of the system 10. Typically, the pump source 32 will include one or more pump lasers of the type known in the art, and may also include other coherent and incoherent sources. The number of lasers and other pump energy sources used in the pump source $32_M$ depends upon the transmission wavelength ranges over which the signal varying device 12 will be operated.

The pump wavelengths are selected such that the combined Raman gain resulting from the pump energy supplied by each pump wavelength produces a desired Raman gain signal variation profile in the transmission wavelength range. The Raman gain signal variation profile can be uniform or nonuniform, linear or nonlinear depending upon a particular application of the device 12. The number of pump wavelengths and the wavelength spacing used in the device 12 can be varied to provide Raman gain over a range of wavelengths. The pump wavelengths, $\lambda_{p1}-\lambda_{pm}$, are generally selected to provide sufficient overlap of the Raman gain profiles to provide control over the Raman gain at one or more wavelengths in the transmission wavelength range.

In addition, the pump energy supplied by at least one of the pump wavelengths can be controllably varied to change the signal variation profile over the wavelength range in the optical fiber. Also, the total pump energy supplied via all the pump wavelengths can be held constant or varied accordingly. One skilled in the art will appreciate that the choice of wavelength can be made to tailor the signal varying characteristics of the device 12 to a particular system configuration.

Typically, the pump wavelengths, $\lambda_{p1}-\lambda_{pm}$, are selected so that the scattered light intensity/gain profile will be substantially uniform over the range of wavelengths. One skilled in the art will appreciate that decreasing the spacing intervals of the pump wavelengths can increase the uniformity of the intensity profile. However, the increased uniformity must be balanced with the increased cost of using additional wavelengths in the device 12 and allowable total power requirements.

Devices 12 having different signal variation profiles and employing different pump wavelengths can be used in combination within the system 10. Also, the pump energy supplied via each pump wavelength can be controlled to compensate for any self-pumping that might occur between the pump wavelengths.

Figure 3:
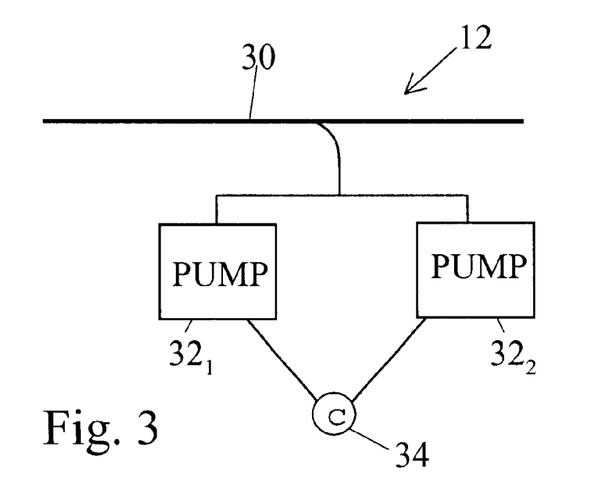
FIGS. 3–5 show signal varying devices of the present invention.

As shown in FIG. 3, a controller 34 can be included in the device 12 and configured to dynamically control the pump energy supplied via one or more of the pump wavelengths. Dynamic control of the pump energy allows for the performance of the device 12 to be varied as signal transmission changes occur, either upstream and/or downstream of the device 12. Thus, the dynamic control provides the ability to continually or periodic modify the operation of the devices 12 in response to communication system variations that inevitably occur over time.

Figure 4:
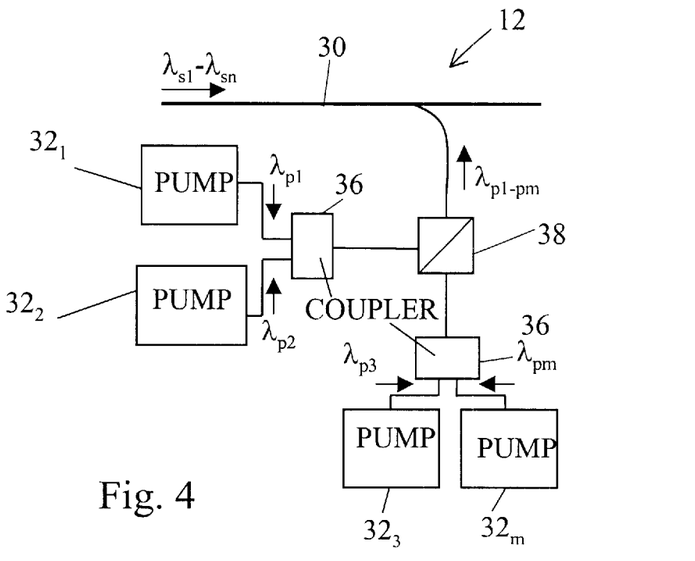

In one aspect of the invention, the pump source 32 is configured to combine arbitrarily spaced pump wavelengths as shown in FIG. 4. Grating stabilized lasers $32_M$ emit pump wavelengths that are combined in pairs using fused DWDM couplers 36. The paired pump wavelengths can be further combined with arbitrarily spaced pump wavelengths using a dichroic filter 24. It will be appreciated that additional wavelengths can be added by cascading the lasers and wavelength combining arrangements.

Figure 5:
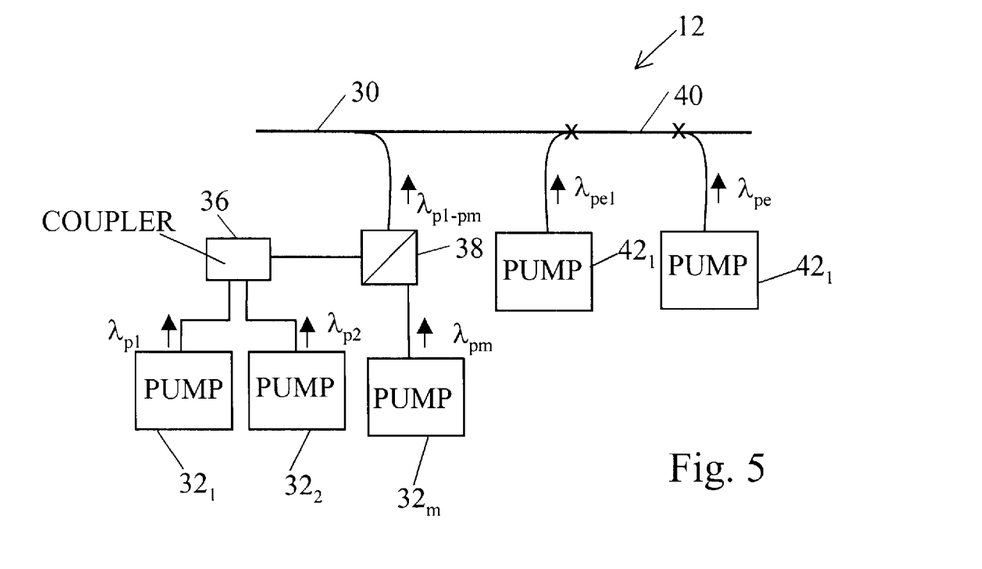

Non-linear intensity profiles can also be provided using the device 12. The device 12 can be used in combination with inherently nonlinear or nonlinearly operated components, such as one or more erbium doped fiber amplifiers, etc., to produce a net linear intensity profiles or different non-linear profiles. For example, an erbium doped fiber 40 that is optically pumped using wavelengths, $\lambda_{pe1}-\lambda_{pei}$, supplied by one or more erbium pump sources 42i can be used in combination with the Raman portion of the signal varying device to provide a multiple stage signal varying device 12, as shown in FIG. 5. It will be appreciated that various EDFA configurations, such as those discussed in the Background, can be used in embodiments incorporating erbium doped fiber.

Figure 6:
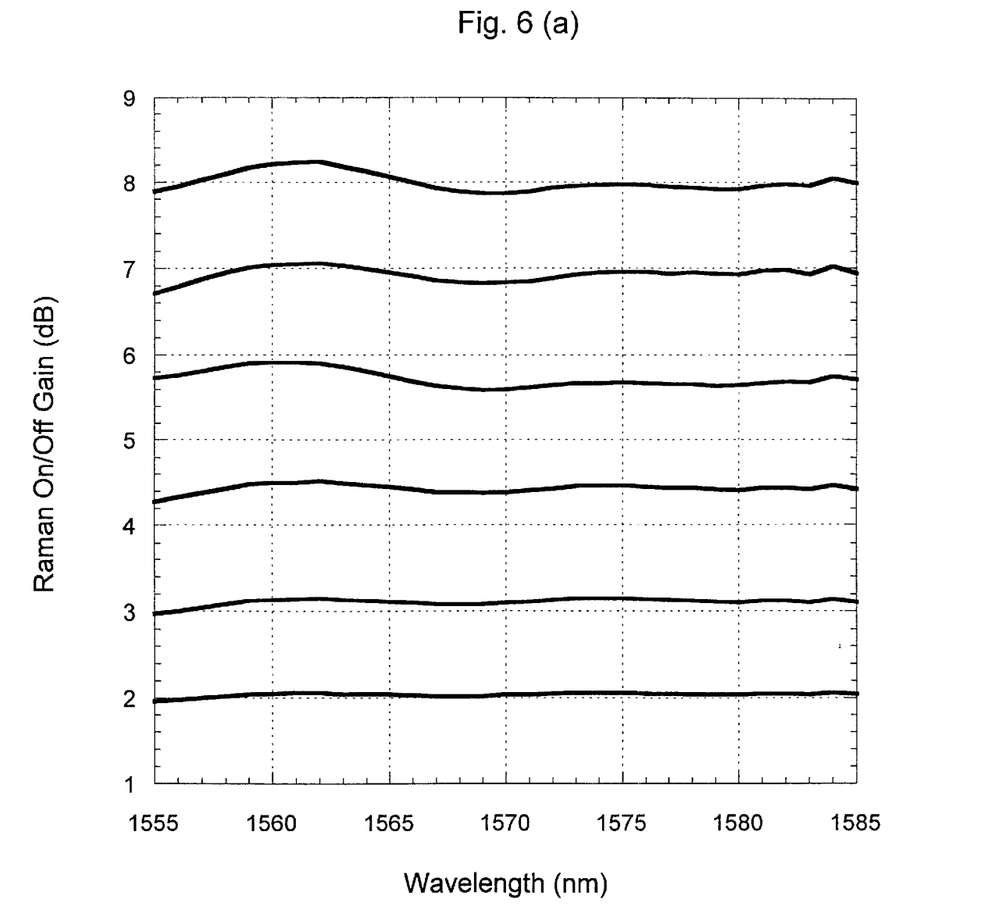
FIGS. 6a–6b shows Raman gain profiles over a 30 nm range as a function of gain; and, FIGS. 7–8 show Raman gain profiles over 35 and 100 nm, respective y, based on a summation of experimental data using single pump wavelength signal varying devices.
Figure 6B:
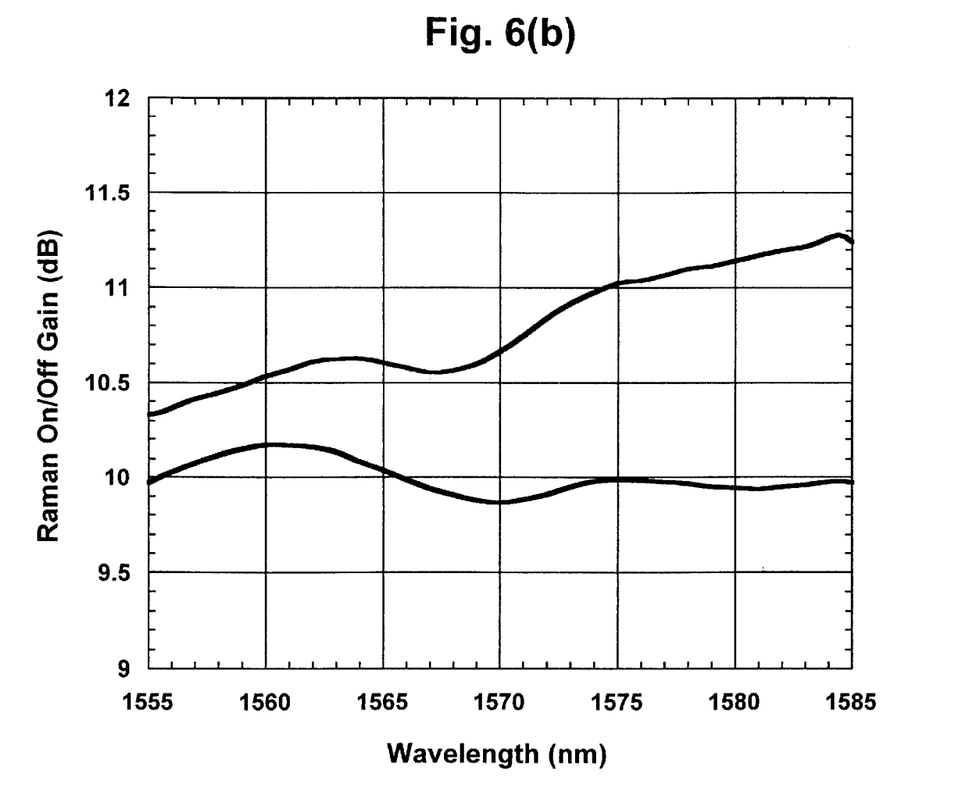

The configuration shown in FIG. 4 was used to further demonstrate the advantages of the present invention. In one example, four pump wavelengths, 1450, 1460, 1485, and 1495 nm, were combined using two 20 nm DWDM couplers and a dichroic filter. The combined pump wavelengths were supplied to DCF to provide Raman gain in the transmission signal wavelength range of 1555 to 1585 nm. As shown in FIG. 6(a), substantially flat Raman gain signal variation profiles (±0.16 dB) can be produced over a 30 nm range for gains ranging from 1 to 8 dB. In addition, the relative power of the pump wavelengths supplied to the device 12 can be varied to produce non-linear profiles that generally increase or decrease across the signal wavelength range, as shown in FIG. 6(b).

Figure 7:
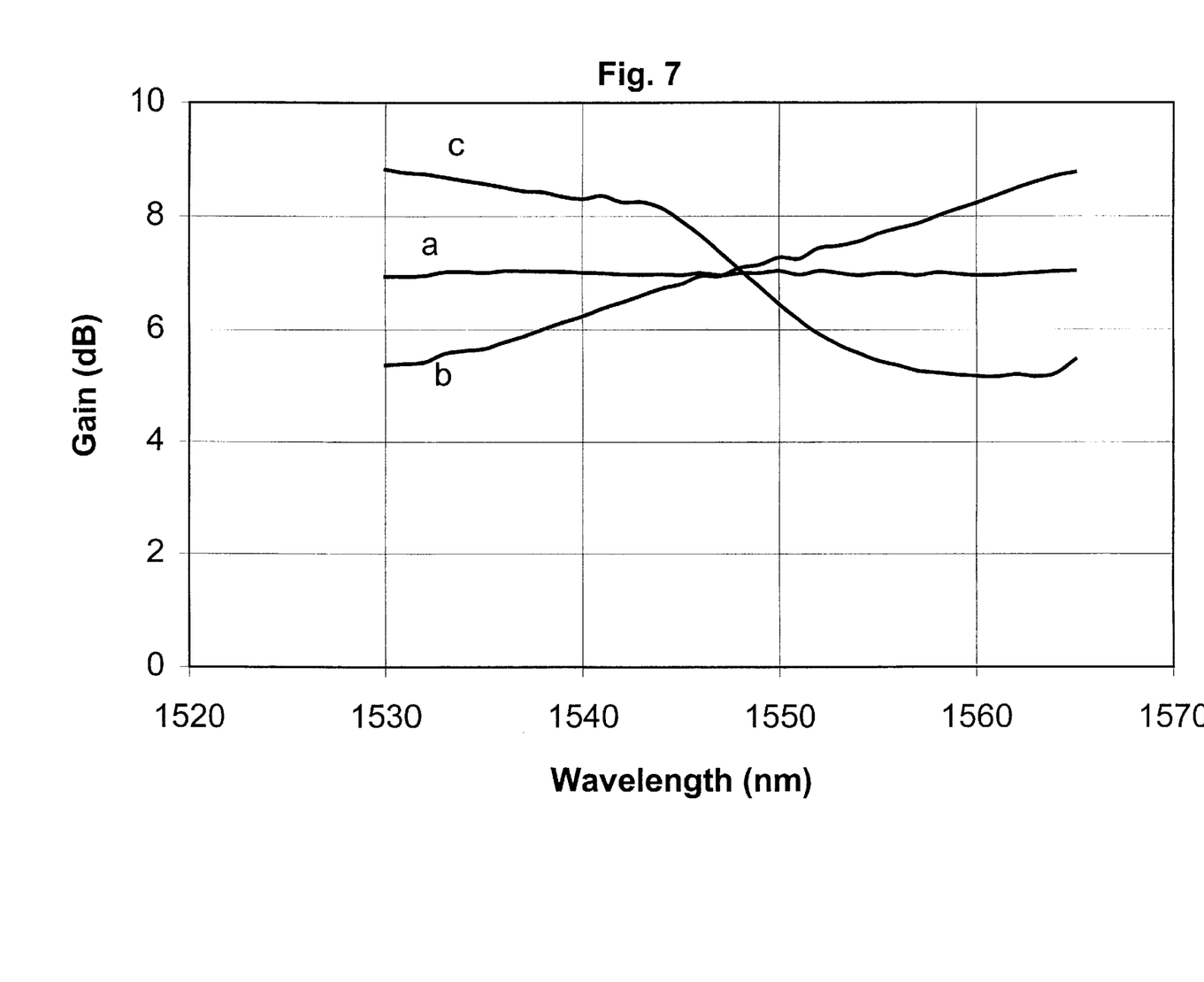
Figure 8:
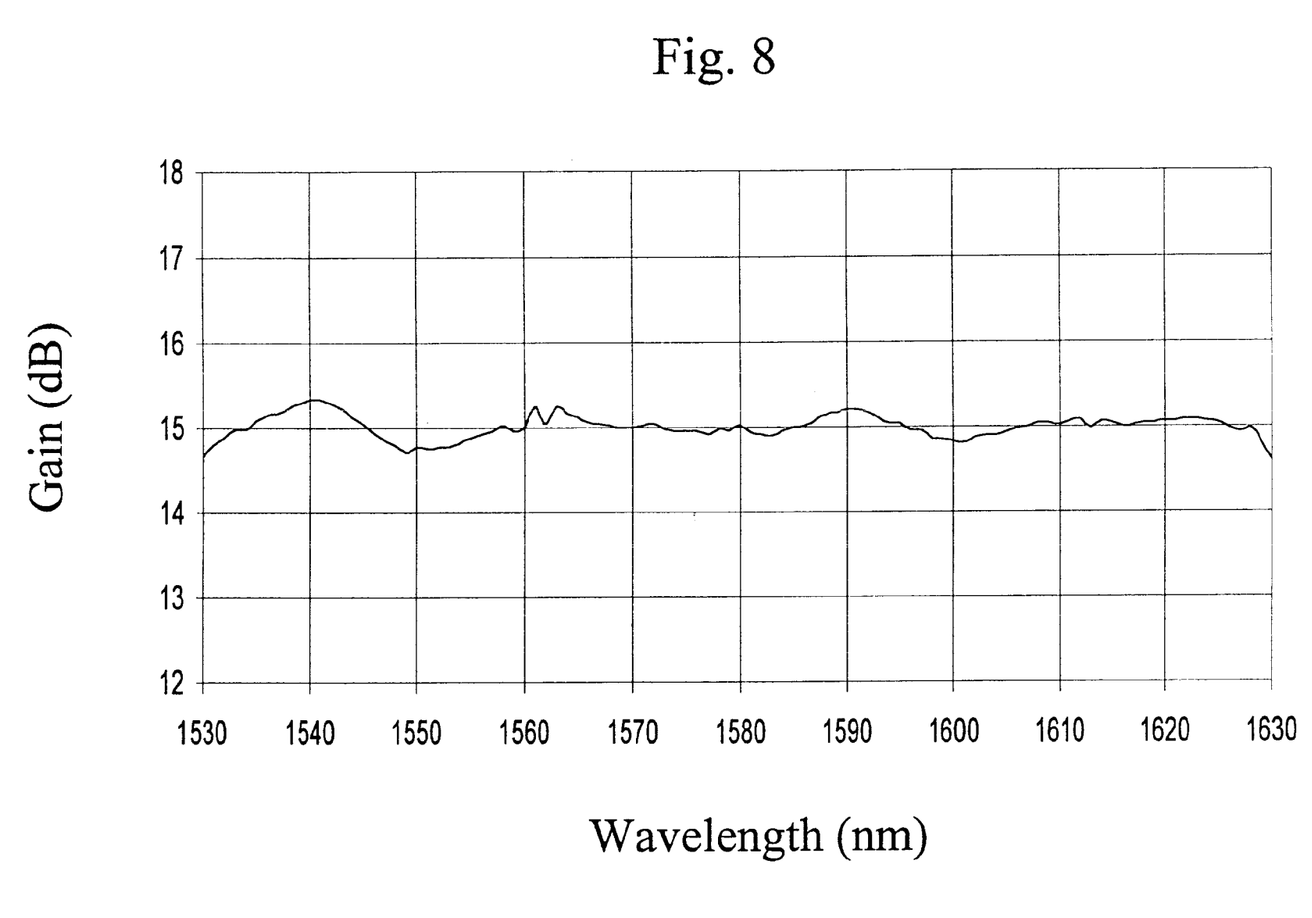

Experimental gain profiles were determined for a number of additional pump wavelengths. Based on the experimental results, Raman signal varying device simulations were performed over 35 nm wide (1530–1565 nm) and 100 nm wide (1530–1630 nm) signal wavelength ranges. The predicted performance of ±0.12 dB and ±0.342 dB over the 35 nm and 100 nm wavelength ranges, as shown in FIGS. 7 (curve a) and 8, respectively, indicates that the signal varying devices of the present invention can be used over a wide range of wavelengths to accommodate numerous channels. FIG. 7 (curves b and c) also shows examples of linear and non-linear profiles that can be produced by varying the relative power at the various pump wavelengths. It is also expected that the number of pumps and the pump wavelength spacing can be further varied to provide a range of signal variation profiles over wide and narrow wavelength ranges.

The signal varying devices 12 of the present invention can be operated in one, two, or three of the signal varying modes, amplification, attenuation, and lossless. By controlling the pump power, one signal varying device can be continuously transitioned between the three modes of operation. In addition, the intensity gain/loss profile can be adjusted in each signal varying device 12 to dynamically control the characteristics of the optical signals exiting the signal varying device 12. It is also possible to operate the signal varying device 12 in more than one mode at the same time. For example, the signal varying device 12 can be operated as an amplifier over part of the signal wavelength range and as an attenuator and/or a lossless link over the remaining part of the signal wavelength range. The multiple mode operation of the signal varying device 12 can be used to compensate for optical signals that enter the signal varying device 12 with a non-linear intensity profile.

In addition, different signal varying devices 12 can be included in the system 10 that are operated with different pump wavelengths and powers to-provide a cumulative signal variation profiles differing from the signal variation profiles of each device 12. For example, the pump wavelengths used in different devices 12 can be varied to compensate for individual device signal variation profile non-uniformities and provide a cumulative signal variation profile that is substantially more uniform than the individual device profiles.

Unlike prior art systems, the present invention does not require that a number of non-linear devices be coordinated and controlled to provide linear intensity variation (gain/loss) profiles. Instead, the present invention provides an optical system incorporating a continuous transition signal varying device that provides increased control over the characteristics of optical signals being transmitted in the system.

Those of ordinary skill in the art will appreciate that numerous modifications and variations that can be made to specific aspects of the present invention without departing from the scope of the present invention. It is intended that the foregoing specification and the following claims cover such modifications and variations.

What is claimed is:

1. An optical transmission system comprising:
   a plurality of optical processing nodes configured to optically communicate via optical signals in a signal wavelength range; and,
   a plurality of signal varying devices positioned to vary an optical signal passing between said processing nodes, wherein said plurality of signal varying devices includes
   a first signal varying device at a first location including optical fiber provided with optical energy in a first set of pump wavelengths from a first corresponding pump source to produce Raman gain having a first signal variation profile over the signal wavelength range, and
   a second signal varying device at a second location remote from said first location and including optical fiber provided with optical energy in a second set of pump wavelenghts from a second corresponding pump source to produce Raman gain having a second signal variation profile ever the signal wavelength range, wherein said first and second signal variation profiles provide for a cumulative signal variation profile over the signal wavelength range that differs from either of the first and second signal variation profiles.

2. The optical transmission system of claim 1 wherein said cumulative signal variation profile is more uniform over the signal wavelength range than said first and second signal variation profiles.

3. The device of claim 1, further comprising at least one erbium doped fiber coupled to said optical fiber.

4. The device of claim 3, wherein the pump energy supplied to said optical fiber in said pump wavelengths is controlled to provide a cumulative Raman gain profile that substantially compensates for signal intensity non-uniformities introduced by said at least one erbium doped fiber and provides a substantially uniform signal variation profile over the signal wavelength range.

5. The device of claim 3 wherein said at least one erbium doped fiber is operated as an amplifier over at least a portion of the signal wavelength range and the pump energy supplied to said optical fiber in said pump wavelengths is controlled such that said optical fiber operates as an attenuator over at least another portion of the signal wavelength range.

6. The device of claim 3 wherein a portion of said optical fiber provides for distributed Raman gain and another portion of said optical fiber provides for concentrated Raman gain.

7. The device of claim 6 further comprising a gain flattening filter positioned to compensate for signal nonuniformities in said erbium doped fiber and said optical fiber.

8. The device of claim 1, wherein said pump wavelengths range selected to provide a substantially linear cumulative signal variation profile over the signal wavelength range.

9. The device of claim 1, wherein said pump wavelengths are selected to provide a substantially uniform cumulative signal variation profile over the signal wavelength range.

10. The device of claim 9, wherein said pump wavelengths are selected to provide a cumulative signal variation profile over the signal wavelength range having a variation of <±1 dB.

11. The device of claim 1, wherein said device is operable in at least one signal varying mode, said mode selected from the group consisting of amplification, attenuation, and lossless transmission.

12. The device of claim 1, wherein said signal wavelength range is 1500 nm to 1650 nm and said pump wavelengths are in a range of 1390 nm to 1510 nm.

13. The device of claim 1, wherein said optical fiber has a transparent transmission range and said signal wavelength range corresponds to said transparent transmission range.

14. The device of claim 1, wherein said pump wavelengths are spaced in intervals of 20 nm or less.

15. The device of claim 1, wherein the pump energy supplied by each of said pump wavelengths is controlled to compensate for Raman self-pumping of the pump wavelengths.

16. The device of claim 1, wherein the optical energy in at least one of said pump wavelengths is controllable to vary the signal variation profile over the signal wavelength range.

17. The device of claim 1, including a controller configured to control the optical energy supplied by at least one of said pump wavelengths to produce a substantially arbitrary signal variation profile over the wavelength range in said optical fiber.

18. The device of claim 1, wherein the first and second pump sources are both oriented for only one of counter-directional pumping and codirectional pumping with respect to the optical signals.

19. The device of claim 1, wherein one of the first and second pump sources is oriented for one of counter-directional pumping and codirectional pumping with respect to the optical signals, and the other of the first and second pump sources is oriented for the other of counter-directional pumping and codirectional pumping with respect to the optical signals.

20. The device of claim 1, further comprising an additional signal varying device including an erbium doped amplifier having a signal variation profile over the signal wavelength range.

21. The device of claim 20, wherein the erbium doped amplifier includes an erbium doped optical fiber segment and at least one corresponding erbium pump source optically coupled to the erbium doped optical fiber segment.

22. The device of claim 20, wherein the first signal varying device is oriented for counter-directional pumping, the additional signal varying device is oriented for codirectional pumping, and the additional signal varying device is at the first location.

23. The device of claim 20, wherein the at least one additional signal varying device is located at one of the first and second locations.

24. The device of claim 1, wherein the first and second signal varying devices include high gain/loss optical fiber.

25. The device of claim 24, wherein the first and second signal varying devices include dispersion compensated fiber.

26. An optical transmission system, comprising:
   at least one optical fiber;
   a plurality of optical processing nodes optically coupled to each other via the at least one optical fiber and configured to optically communicate via optical signals in a signal wavelength range;
   a first signal varying device optically coupled to the at least one optical fiber at a first location, and including a first Raman pump source optically coupled to the optical fiber and producing a first signal variation profile in the optical fiber in the signal wavelength range;
   a second signal varying device optically coupled to the at least one optical fiber at a second location, and including a second Raman pump source optically coupled to the optical fiber and producing a second signal variation profile in the optical fiber in the signal wavelength range; and
   a third signal varying device optically coupled to the at least one optical fiber at a third location, and including at least one erbium doped optical fiber segment in series with the at least one optical fiber segment, and an erbium pump source optically coupled to the erbium doped fiber and producing a third signal variation profile in the erbium doped fiber in the signal wavelength range, wherein the first, second, and third signal variation profiles provide for a cumulative signal variation profile in the signal wavelength range, and the cumulative signal variation profile differs from each of the first, second, and third signal variation profiles.

* * * * *